US012774081B2

(12) United States Patent
Werthmann

(10) Patent No.: US 12,774,081 B2
(45) Date of Patent: Oct. 27, 2026

(54) PROTECTIVE DEVICE FOR AIRCRAFT WINDOW UNITS, PROTECTIVE DEVICE SYSTEM FOR AIRCRAFT, AIRCRAFT

(71) Applicant: Airbus Operations GmbH, Hamburg (DE)

(72) Inventor: Vitalij Werthmann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 19/401,534

(22) Filed: Nov. 26, 2025

(65) Prior Publication Data

US 2026/0167317 A1 Jun. 18, 2026

(30) Foreign Application Priority Data

Dec. 17, 2024 (DE) ......................... 102024138279.1

(51) Int. Cl.
*B64C 1/14* (2006.01)
*B64D 45/00* (2006.01)

(52) U.S. Cl.
CPC ............ *B64C 1/1484* (2013.01); *B64D 45/00* (2013.01)

(58) Field of Classification Search
CPC ....... B64C 1/14; B64C 1/1484; B64C 1/1492; B64D 45/00
See application file for complete search history.

(56) References Cited

U.S. PATENT DOCUMENTS 5,515,898 A * 5/1996 Alcocer .................. E06B 9/262 160/265
6,484,449 B1 11/2002 Artsiely
7,690,414 B2 * 4/2010 Knowles ................ B60J 1/2025 160/90
2008/0148638 A1 * 6/2008 Knowles ............... B64C 1/1484 49/70
2008/0190568 A1 8/2008 Schwarz et al.
2009/0044695 A1 2/2009 Benjamin et al.
2010/0027119 A1 2/2010 Johnson et al.
2023/0322354 A1 * 10/2023 Diaz ..................... B64C 1/1492 160/179

FOREIGN PATENT DOCUMENTS

CA 2668080 A1 12/2009
DE 202010004404 U1 7/2010
DE 102023100666 A1 7/2024
WO 2015167949 A1 11/2015
WO 2023183522 A1 9/2023
WO 2024072359 A1 4/2024

* cited by examiner

*Primary Examiner* — Tye William Abell
(74) *Attorney, Agent, or Firm* — KDW Firm PLLC

(57) ABSTRACT

A protective device for aircraft window units includes a frame unit, multi-part and closable protective unit in the frame unit, at least one pretensionable movement unit on the protective unit to transfer the protective unit from at least one open position state into a closed position state, and a triggering unit coupled to the at least one movement unit via at least one coupling region of the at least one movement unit. When the protective device is in an installed state in an aircraft window unit, the triggering unit is between an exterior window unit of the aircraft window unit and the frame unit, such that mechanical forces acting on the exterior window unit can be transmitted to the triggering unit for triggering operation at the at least one movement unit. A protective device system for aircraft, and an aircraft are disclosed.

11 Claims, 6 Drawing Sheets

PROTECTIVE DEVICE FOR AIRCRAFT WINDOW UNITS, PROTECTIVE DEVICE SYSTEM FOR AIRCRAFT, AIRCRAFT

TECHNICAL FIELD

The disclosure herein relates to a protective device for aircraft window units, to a protective device system for aircraft, and to an aircraft.

BACKGROUND

Aircraft generally have a very robust outer skin which protects an interior of the aircraft against a wide variety of external influences acting on the aircraft. A particular focus is placed here in particular on regions that accommodate persons or freight during flight. These regions must be protected against all external influences such that undesired external influences can be reliably ruled out at all times and under all circumstances. These regions are located predominantly in the aircraft fuselage, such that the aircraft window units positioned there must also each be correspondingly robust and secure.

By contrast to the rest of the aircraft fuselage, which is commonly produced predominantly from aluminum, for example, the aircraft window units constitute potential weak points in the aircraft, because they may comprise materials that are less robust than metal. In particular in sensitive regions that are possibly particularly exposed to external influences, it may seem necessary to occasionally dispense with aircraft window units and instead provide a closed region in the aircraft fuselage.

This can possibly be considered disadvantageous because it means that neither on-board personnel nor passengers have a desired view to the outside at this location. In particular, for routine checks, this view to the outside at as many locations in the aircraft as possible can be helpful for on-board personnel in order to be enable them to have an additional overview of external operations taking place outside the aircraft. A view to the outside from each seat row can however also be helpful in providing adequate passenger comfort.

For aircraft having propeller units, reinforced fuselage structures in regions adjacent to the propeller drives are already known for the purposes of providing a particularly high level of safety at these locations. This additional material at this location however counteracts a general desire to make aircraft as lightweight as possible. Furthermore, such reinforcing elements around aircraft window units can only provide limited protection for the intrinsically sensitive window surfaces.

Therefore, in this context, aircraft window units with inserted wire mesh are also already known, but in the event of undesired relatively intense external influences, these too may offer adequate protection only to a very limited degree. Depending on the design of the aircraft, in particular cases, the only remaining option is to greatly reduce the size of corresponding aircraft window units, or even omit these entirely, in these regions facing the propeller unit.

At present, it is difficult to find suitable transparent materials on the market which would firstly offer additional safety, beyond their own protective action, for the scenarios discussed, and simultaneously make it possible to achieve a design which is lightweight and as slim as possible for use in the aircraft fuselage.

SUMMARY

Against this background, it is an aim of the disclosure herein to provide a protective device for aircraft window units, a protective device system for aircraft, and an aircraft, which at least partially overcome the aforementioned disadvantages.

The object is achieved by a protective device for aircraft window units, and a protective device system for aircraft, and by an aircraft disclosed herein.

According to the disclosure herein, a protective device for aircraft window units is provided which comprises a frame unit, a multi-part and closable protective unit arranged in the frame unit, at least one pretensionable movement unit which is arranged on the protective unit and which is designed to transfer the protective unit from at least one open position state into a closed position state, and a triggering unit which is coupled to the at least one movement unit via at least one coupling region of the at least one movement unit. When the protective device is in an installed state in an aircraft window unit, the triggering unit is arranged between an exterior window unit of the aircraft window unit and the frame unit, such that mechanical forces acting on the exterior window unit can be transmitted to the triggering unit for the purposes of a triggering operation at the at least one movement unit.

Furthermore, according to the disclosure herein, a protective device system for aircraft is provided which comprises at least two protective device according to the disclosure herein and which comprises a control unit, the control unit being coupled to the at least two protective devices and having a control program. The control unit with control program is configured to detect respective triggering operations at the at least two protective devices and substantially simultaneously effect a triggering operation at the at least one further protective device in each case.

Furthermore, according to the disclosure herein, an aircraft is provided which comprises at least one protective device according to the disclosure herein or a protective device system according to the disclosure herein.

It is therefore a concept of the disclosure herein to provide a protective device for aircraft window units, which protective device can advantageously be arranged at aircraft window units for the purposes of protecting against particular external influences. In the event of an intense impact against the aircraft window unit at which such a protective device is installed, a closed state of the protective device can be implemented very quickly by a triggering mechanism, such that an interior space situated behind the protective device can be additionally particularly well protected within an extremely short time.

A particular advantage thus consists in that, before a triggering operation results in a closed position state, various open position states of the protective device are possible, allowing a substantially clear view to the outside through the protective device and the aircraft window unit.

For those persons wishing to look through the multi-part protective device in the various open position states, the device feels familiar because similar resulting partial views are already known from other areas of life. Such other areas of life may for example be any window units having louvre devices or the like.

Since, in the closed position state, the protective device according to the disclosure herein offers very reliable additional protection that is adequate for the above-described purposes, it is possible to dispense with reinforcement material in the areas in which the aircraft window units comprising a protective device according to the disclosure herein are installed, such that, overall, a more lightweight aircraft design can be provided which exhibits additional safety measures in order to advantageously enhance an existing level of safety.

The aforementioned advantages also apply, where transferable, to the proposed protective device system according to the disclosure herein for aircraft, and to the proposed aircraft according to the disclosure herein.

In a further embodiment of the disclosure herein, the protective unit comprises at least two slat elements which are mounted movably in the frame unit and which have respective rotary spindles.

Slat elements offer the advantage inter alia that, when they are in open position states, it is possible to see clearly through them, and when they are in closed positions, they offer robust protection because they collectively form a closed overall surface.

In a further embodiment of the disclosure herein, the at least one movement unit comprises at least one spring element assembly which is arranged in the at least one coupling region and which has a tension-maintaining element.

In this way, the at least one movement unit can be particularly effectively provided in a pretensioned state by the tension-maintaining element, wherein, in a triggering scenario, the triggering unit in the at least one coupling region can then correspondingly trigger the tension-maintaining element, such that the at least one movement unit can implement the closed state of the protective unit. Depending on the spring element assembly selected, this can be effected particularly quickly, wherein closing times in the range from 0.001 to 0.005 seconds are to be regarded as particularly advantageous.

In a further embodiment of the disclosure herein, the at least one movement unit comprises at least one first transmission unit, such that the at least two slat elements are movable simultaneously and in parallel with one another by the at least one movement unit and the at least one first transmission unit.

The at least one movement unit can thus be moved by the triggering unit via at least one coupling region, wherein, owing to the first transmission unit that is provided, all slat elements that are provided can be transferred simultaneously, and in parallel with one another, from a variety of open positioned states into a closed position state. This offers the advantage that, for protective purposes, a surface which is closed to the greatest possible extent and which is produced by the slat elements can be provided within an extremely short time in the region of the aircraft window unit at which the protective device according to the disclosure herein is arranged.

In a further embodiment of the disclosure herein, the triggering unit is coupled to the at least one movement unit via at least two coupling regions of the at least one movement unit, and the triggering unit comprises at least one second transmission unit, such that a triggering operation at the at least one movement unit at a first coupling region can substantially simultaneously also be effected at at least one further coupling region by the triggering unit and the at least one second transmission unit.

A fast and reliable approach in a triggering scenario can thus be even more effectively achieved, because all provided coupling regions that detect an externally acting force can transmit this information, approximately in real time, to further coupling regions by the second transmission unit. In the case of pretensioned spring element assemblies, it is thus possible for all pretension spring forces to be utilized approximately simultaneously in order to implement a particularly fast closing time of the protective unit.

In a further embodiment of the disclosure herein, the protective device comprises at least two first transmission units and at least two second transmission units, wherein respective rotary spindles of the at least two slat elements are coupled at their respective ends both to a first and to a second transmission unit, such that a triggering operation at the at least one movement unit on a first side of the respective rotary spindles can substantially simultaneously also be effected on a second side of the respective rotary spindles.

In the case of pretensioned spring element assemblies on respective side regions of the rotary spindles, it is thus possible for all pretension spring forces to be utilized approximately simultaneously in order to implement a particularly fast closing time of the protective unit.

In a further embodiment of the disclosure herein, the at least two slat elements are selected from: slat elements made of metal, slat elements made of aluminum, slat elements made of metal with a thickness between 10 and 20 mm, preferably with a thickness of 14 mm, slat elements made of aluminum with a thickness between 10 and 20 mm, preferably with a thickness of 14 mm.

In this way, an adequate protective action can be provided without disregarding the concept of a lightweight design of the aircraft structure.

Furthermore, the term “thickness” may in each case refer to an average thickness of the slat elements. In other words, the stated thicknesses in the respective variants of the aforementioned slat elements do not preclude these from having special geometrical shapes, in particular in the respective edge regions of the slat elements.

According to a further embodiment of the system according to the disclosure herein, the further triggering operation can be effected in accordance with a user-defined spatial proximity of the at least two protective devices to one another.

Even when no external exertion of force is detected, particularly protected positions of the protective devices can be implemented in regions that are temporarily at risk, such that, overall, an existing level of safety can be yet further improved. In particular at directly adjacent aircraft window units at which the system according to the disclosure herein is arranged, it is thus possible for ample protection to be provided, should this be sensible for particular operations.

BRIEF DESCRIPTION OF THE DRAWINGS

The disclosure herein will be discussed in more detail below on the basis of the example embodiments illustrated in the schematic figures.

Figure 1:
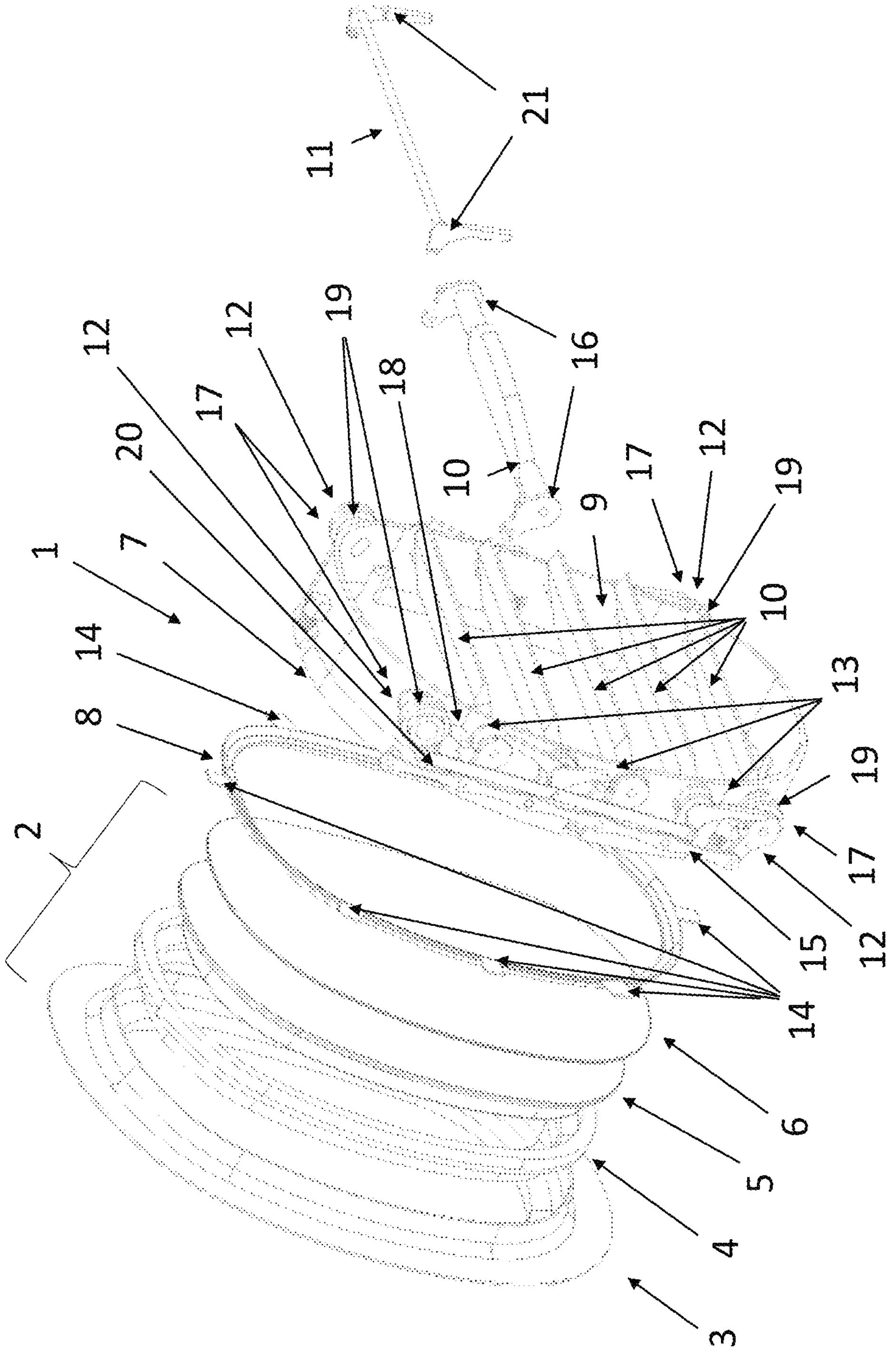
FIG. 1 shows a schematic exploded view of a protective device for aircraft window units.

In the figures of the drawing, elements, features and components which are identical, of identical function and of identical action are each denoted by the same reference sign unless stated otherwise.

DETAILED DESCRIPTION

FIG. 1 shows a schematic exploded view of a protective device 1 for aircraft window units. The protective device 1 is illustrated as being positioned in front of an exterior window unit 2 of an aircraft window unit (not shown in full).

The illustrated exterior window unit 2 consists of a window frame 3, a sealing element 4, an outer pane 5 and an inner pane 6. This exterior window unit 2 is illustrated merely by way of example. In embodiments which are not illustrated in any more detail, it is conceivable that the protective device 1 according to the disclosure herein may also be provided for other designs of exterior window units 2 of aircraft window units. For example, it is conceivable for only a specially designed outer pane 5 to be provided, or for additional inner panes 6 to be provided.

A complete aircraft window unit may for example also comprise further elements that enable the protective device 1 to be located in a cabin interior region of an aircraft, so as to provide a correspondingly familiar overall appearance on a passenger-facing side. In particular, it is conceivable that such a complete aircraft window unit can receive the protective device 1 according to the disclosure herein such that it substantially cannot be grasped or touched from the outside by passengers or other persons. For example, a further inner pane 6 may be provided, such that the protective device 1 according to the disclosure herein is for example surrounded by at least two inner panes 6 and thus cannot be manipulated from the outside, such that only the intended triggering scenarios can operate the mechanism according to the disclosure herein.

Also illustrated is a frame unit 7 of the protective device 1 for aircraft window units. A triggering unit 8 of the protective device 1 is also illustrated between the frame unit 7 and the exterior window unit 2. Here, the triggering unit 8 is substantially annular, wherein an outer contour of the triggering unit 8 corresponds to an outer periphery of the inner pane 6, such that the triggering unit 8 can fit exactly between the exterior window unit 2 and the frame unit 7 without obstructing a field of view through the frame unit 7 and the exterior window unit 2.

A multi-part and closable protective unit 9 is also illustrated as being arranged in the frame unit 7, wherein, in this example embodiment, the protective unit 9 comprises a total of six slat elements 10 having respective rotary spindles 11. The uppermost slat element 10 (in relation to the plane of the image) is illustrated in an uninstalled state.

Also illustrated are pretensionable movement units 12 which are arranged on the protective unit 9 and which are each designed to transfer the protective unit 9 from at least one open position state into a closed position state. Thus, when the protective device 1 is in an installed state, the triggering unit 8 is arranged between the exterior window unit 2 and the frame unit 7, such that mechanical forces acting on the exterior window unit 2 can be transmitted to the triggering unit 8 for the purposes of a triggering operation at the at least one movement unit 12.

Here, the triggering unit 8 is coupled to the movement units 12 via a total of six coupling regions 13 of the movement units 12, wherein the perspective illustration means that only the front three of these coupling regions 13 can be seen in FIG. 1.

The triggering unit 8 has a total of six protruding contact elements 14 which can be received by respective depressions of the frame unit 7, such these contact elements 14, of which there are three at each side of the frame unit 7, are in contact with coupling regions 13 provided there. Forces acting on the triggering unit 8 in the direction of the frame unit 7 can thus be correspondingly transmitted via the coupling regions 13 to the respective movement units 12 for the purposes of a triggering operation.

The movement units 12 are furthermore illustrated with a first transmission unit 15. The first transmission unit 15 is illustrated as being arranged in multi-part form on the protective device 1, in particular on respective rotary spindles 11 of respective slat units 10, such that the six slat elements 10 are movable simultaneously and in parallel with one another by the movement units 12 and the at least one first transmission unit 15. A rear side region of the protective device 1 is concealed in this perspective view, wherein a transmission unit 15 may equally also be provided on this rear side, as can be better appreciated from the following figures. The uppermost slat element 10 in relation to the plane of the image is illustrated as having been detached, such that, adjacent to this uppermost slat element 10, lifting elements 16 of the first transmission unit 15 can be clearly seen in the illustration.

The movement units 12 are furthermore illustrated as having a total of four spring element assemblies 17 that have respective tension-maintaining elements 18, wherein these components 17, 18 are provided in respective coupling regions 13, and the perspective illustration means that only three spring element assemblies 17 and one tension-maintaining element 18 can be seen in FIG. 1.

The spring element assemblies 17 each comprise a torsion spring 19. When the movement units 12 are in a pretensioned state, the respective tension-maintaining elements 18 keep the torsion springs 19 of the respective spring element assemblies 17 in a pretensioned state, in which the protective unit 9 is correspondingly in an open position state. In a normal situation in which no external mechanical forces act on the exterior window unit 2 or, therefore, on the triggering unit 8, the protective device 1 is therefore in a pretensioned state. This equates to a situation in which the slat elements 10 are each in an approximately horizontal position and are parallel to one another (in relation to the plane of the image), providing an at least partially clear view through the protective unit 9 or, in part, through the protective device 1.

In this embodiment illustrated in FIG. 1, the triggering unit 8 is coupled to the movement units 12 via the coupling regions 13 of the movement units 12, wherein the triggering unit 8 is furthermore illustrated as having a second transmission unit 20, such that a triggering operation at the movement units 12 at a first coupling region 13 can substantially simultaneously also be effected at at least one further coupling region 13 by the triggering unit 8 and the second transmission unit 20.

The perspective illustration means that only one second transmission unit 20 can be seen. A further second transmission unit 20 is provided analogously on that side of the frame unit 7 which is not visible, as can be more clearly appreciated from the following FIGS. 2 to 4.

In other words, in this illustrated design variant, the protective device 1 comprises two first transmission units 15 and two second transmission units 20, wherein respective rotary spindles 11 of the at least two slat elements 10 are coupled at their respective ends both to a first and to a second transmission unit 15, 20, such that a triggering operation at the movement units 12 on a first side of the respective rotary spindles 11 can substantially simultaneously also be effected on a second side of the respective rotary spindles 11.

Of the uppermost slat element 10, a further detail view is shown without the slat element 10 and with only the remaining rotary spindle 11 clearly visible. Illustrated at each of the side regions of the rotary spindle 11 are triggering finger elements 21 of the respective second transmission units 20, which correspondingly trigger the above-described triggering mechanism at further contact regions 13 such that, overall, an approximately simultaneous triggering force of all provided pretensioned torsion springs 19 can be utilized for a particularly fast closing mechanism. Here, a size and load of each spring may be provided such that, for example, an angular acceleration of the mechanism can be achieved in order to realize approximately a closing time with a value between 0.001 and 0.005 seconds. In this context, it is conceivable for all provided torsion springs 19 to be collectively dimensioned so as to achieve this described effect of virtually simultaneous triggering of the torsion springs 19 with correspondingly fast closing times. The respective triggering finger elements 21 are thus coupled in the respective coupling regions 13 to the respective spring element assemblies 17 and the respective tension-maintaining elements 18 such that triggered tension-maintaining elements 18 not only trigger associated torsion springs 19 but simultaneously trigger further torsion springs 19 via the second transmission unit 20. If an external mechanical load acts on the exterior window unit 2, the acting mechanical forces are transmitted to the triggering unit 8, which then presses against the at least one tension-maintaining element 18. Via the two transmission units 15, 20, the mechanism according to the disclosure herein is correspondingly triggered, wherein all pretensioned movement units 12 then ultimately effect the closing operation of the protective unit 9 approximately in real time, such that a region situated behind the protective unit in the direction of the cabin interior is immediately protected against the external forces by a closed surface that is formed. Here, the respective triggering finger elements 21 are mounted rotatably on the associated rotary spindle 11, such that the transmission can be advantageously effected as described above. Irrespective of the location of the external mechanical action, the annular triggering unit 8 is thus configured to implement respective transmission paths, wherein, by the two transmission units 15, 20, the proposed protective device 1 correspondingly effects a transfer and thus virtually simultaneous triggering of the individual movement units 12. In a design variant that is not illustrated in any more detail, protective devices 1 are conceivable which can additionally be advantageously assisted with regard to the triggering operations and closing operations by electromechanical units and correspondingly coupled sensor systems, wherein the underlying inventive concept, namely the separate positioning of the triggering unit 8, is to be implemented accordingly.

Here, the slat elements 10 may be selected from: slat elements made of metal, slat elements made of aluminum, slat elements made of metal with a thickness between 10 and 20 mm, preferably with a thickness of 14 mm, slat elements made of aluminum with a thickness between 10 and 20 mm, preferably with a thickness of 14 mm.

In the example embodiment illustrated, the slat elements 10 are for example provided with an average thickness of 14 mm, and furthermore have a geometrical shape such that, when the protective unit 9 is in a closed position state, an at least partial overlap of the slat elements 10 is possible in order to achieve a preferred closed and particularly safe position state.

In further design variants that are not illustrated in any more detail, it is also conceivable for the protective device 1 to be equipped at least in part with sensor elements and electromagnetic components, such that the triggering mechanism discussed above can be advantageously additionally assisted. For example, sensor elements may additionally be provided where the triggering unit 8 is in contact with the frame unit 7, such that this information can be used for further purposes, for example for an activation of electromagnetic components. For this purpose, the protective device 1 may comprise a control assembly or the like, and the electromagnetic components may for example be provided for effecting additional accelerations or triggering operations at the at least one movement unit. It is also conceivable for such additional components to be provided only for documentation purposes or the like in order to document respective states of the protective device 1, for example approximately in real time. This information can thus be passed for example to a pilot, such that this can then be informed in good time of a possible exceptional event.

Figure 2:
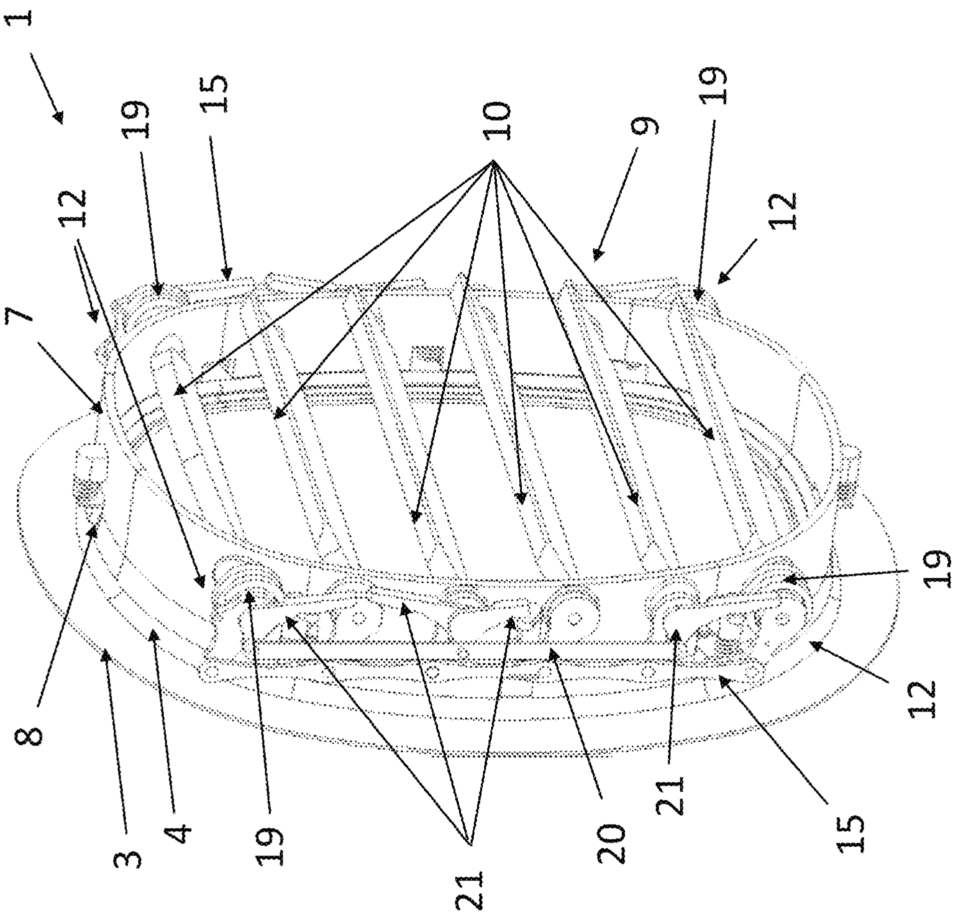
FIG. 2 shows a schematic perspective view of a protective device for aircraft window units.

FIG. 2 shows a schematic perspective view of a protective device 1 for aircraft window units. This is the same protective device 1 as has already been described and discussed in more detail with reference to FIG. 1, wherein the same reference signs apply and will therefore not be introduced once again at this juncture. Here, the protective device 1 is illustrated in an assembled and open position state, allowing an at least partially clear view through the protective device 1.

Figure 3:
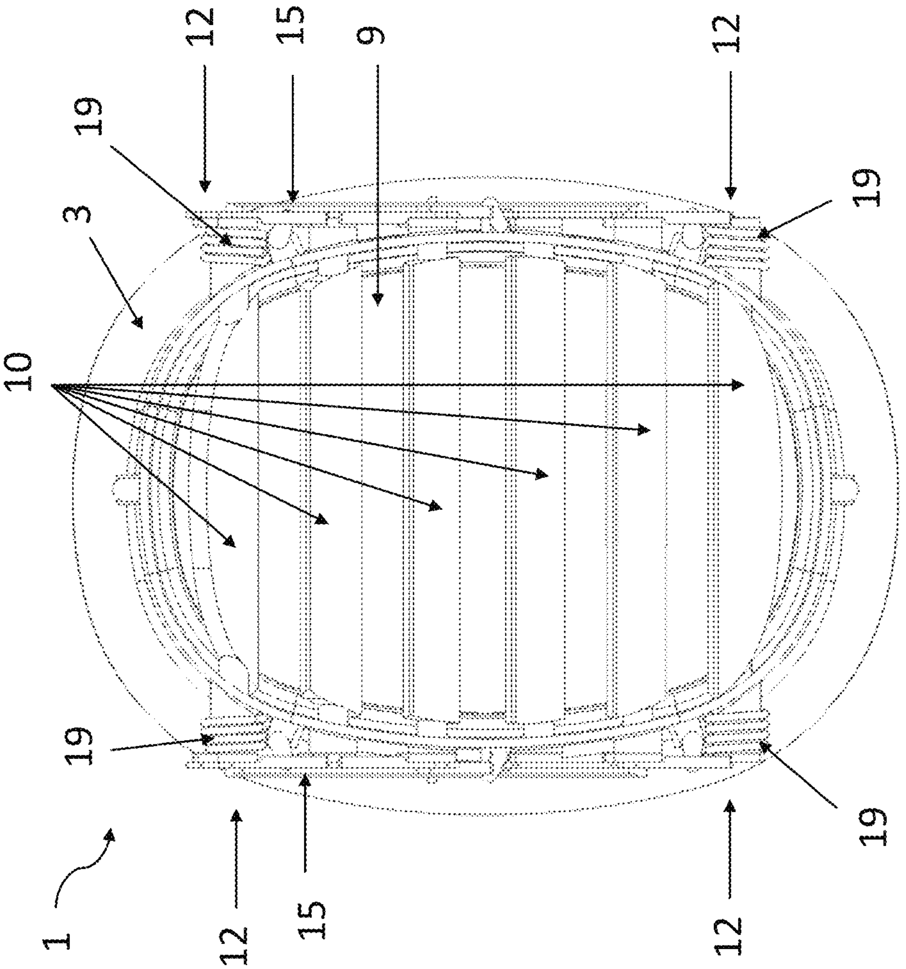
FIG. 3 shows a schematic plan view of a protective device for aircraft window units.

FIG. 3 shows a schematic plan view of a protective device 1 for aircraft window units. This is the same protective device 1 as has already been described and discussed in more detail with reference to FIG. 1, wherein the same reference signs apply and will therefore not be introduced once again at this juncture.

Figure 4:
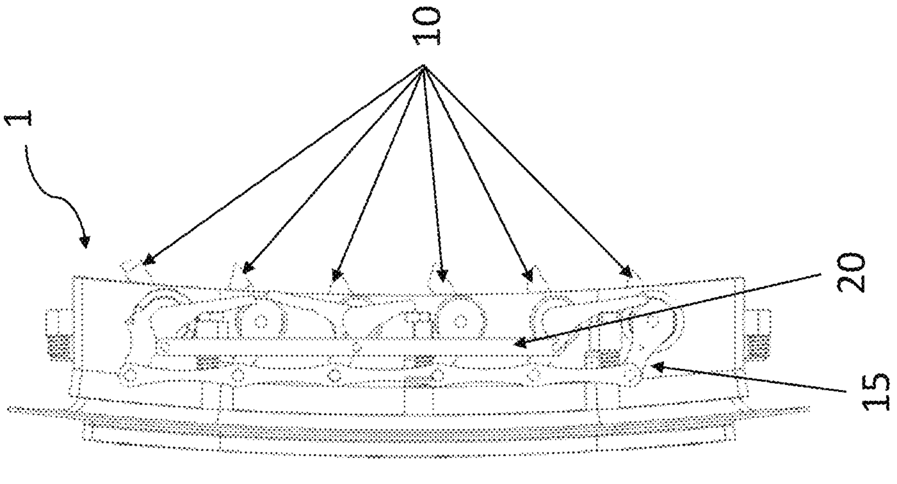
FIG. 4 shows a schematic side view of a protective device for aircraft window units.

FIG. 4 shows a schematic side view of a protective device 1 for aircraft window units. This is the same protective device 1 as has already been described and discussed in more detail with reference to FIG. 1, wherein the same reference signs apply and will therefore not be introduced once again at this juncture.

Figure 5:
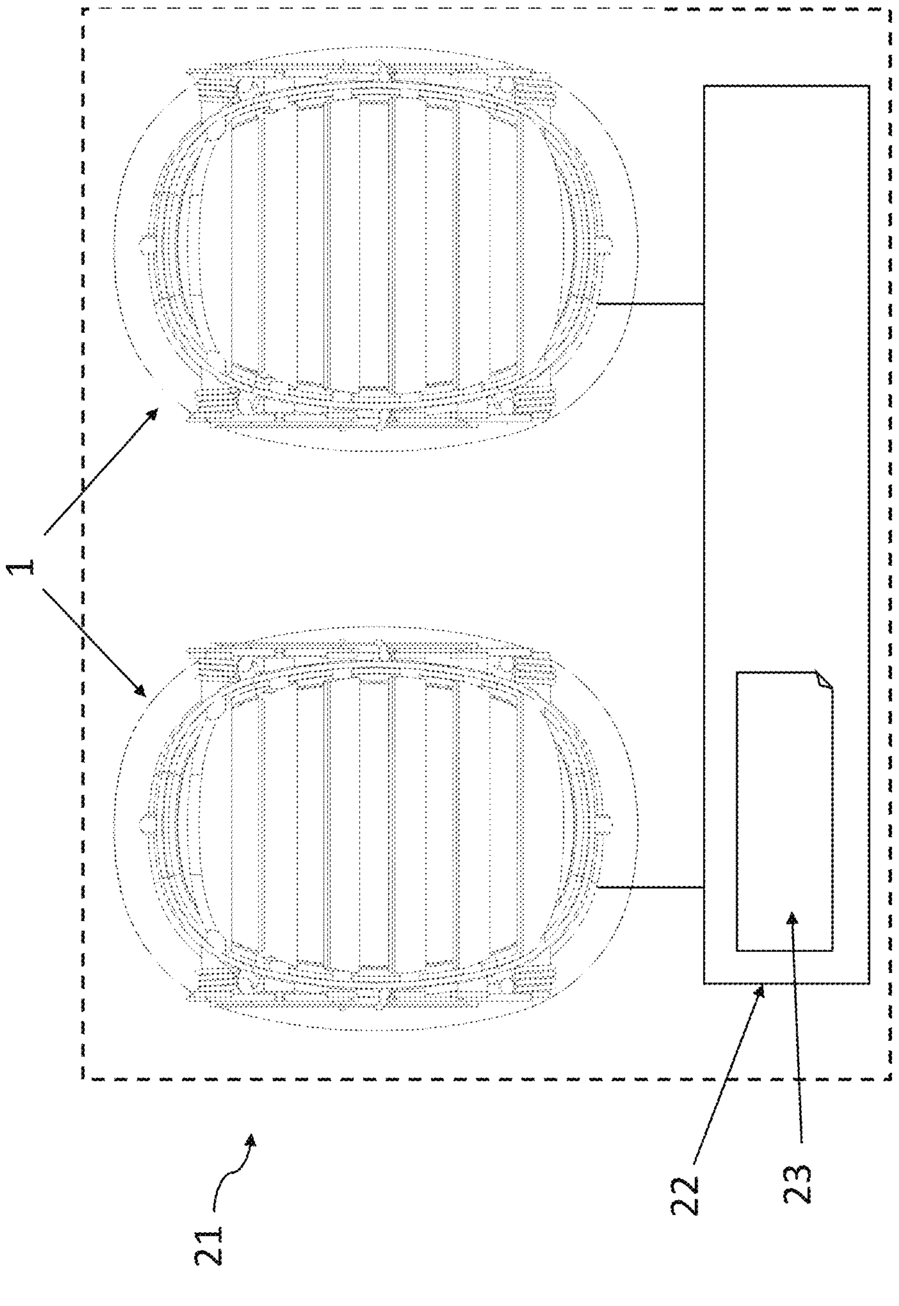
FIG. 5 shows a schematic view of a protective device system for aircraft.

FIG. 5 shows a schematic view of a protective device system 22 for aircraft. This protective device system 22 is illustrated as having two protective devices 1, which are each coupled to a control unit 23 having a control program 24. The control unit 23 with control program 24 is configured to detect respective triggering operations at the at least two protective devices 1 and substantially simultaneously effect a triggering operation at the other, further protective device 1 in each case. In design variants that are not illustrated, it is possible for more than two protective devices 1 to be provided. It is also possible for triggering operations be effected in accordance with a user-defined spatial proximity of the at least two protective devices 1 to one another. For example, if a triggering operation is triggered at one protective device 1, this can also lead to a triggering operation at a directly adjacent triggering device 1, with this further triggering operation being effected by the control unit 23 with control program 24. This can sometimes result in a faster reaction, because it is not firstly necessary for the further triggering unit to be triggered by the directly adjacent protective device 1 in order to realize a desired protective mechanism.

Figure 6:
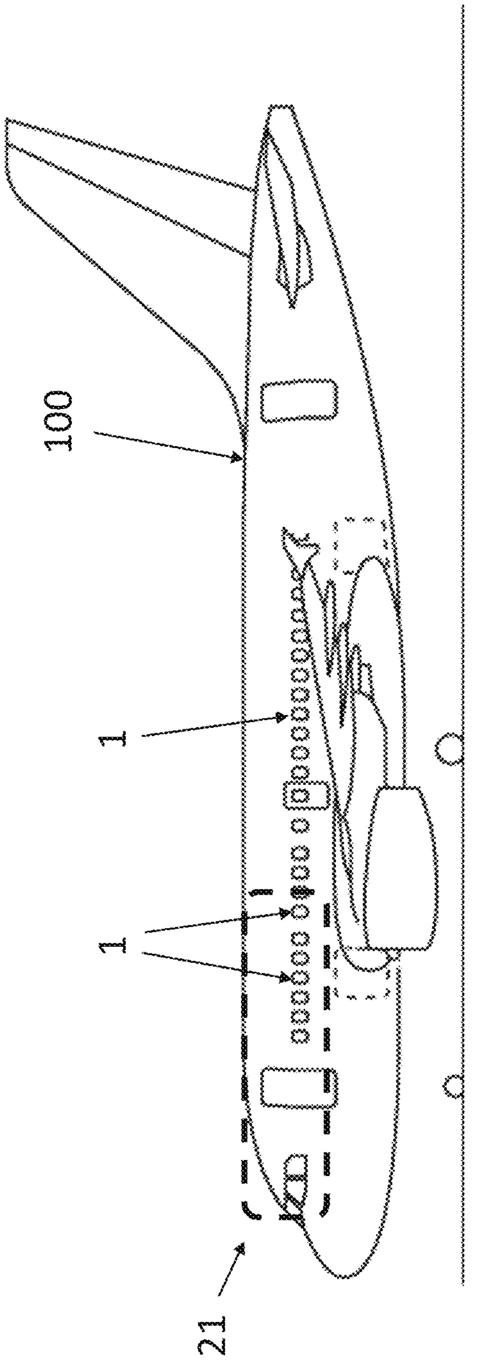
FIG. 6 shows a schematic view of an aircraft according to the disclosure herein.

FIG. 6 shows a schematic view of an aircraft 100 according to the disclosure herein. This aircraft 100 is illustrated as having both a separate protective device 1 according to the disclosure herein and a protective device system 22 according to the disclosure herein, wherein the protective device system 22 is provided so as to have two protective devices 1 according to the disclosure herein.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiments. In addition, in this disclosure, the terms "comprise" or "comprising" do not exclude other elements or steps, the terms "a" or "one" do not exclude a plural number, and the term "or" means either or both. Furthermore, characteristics or steps, which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Protective device
2 Exterior window unit
3 Window frame
4 Sealing element
5 Outer pane
6 Inner pane
7 Frame unit
8 Triggering unit
9 Protective unit
10 Slat element
11 Rotary spindle
12 Movement unit
13 Coupling region
14 Contact element
15 First transmission unit
16 Lifting element
17 Spring element assembly
18 Tension-maintaining element
19 Torsion spring
20 Second transmission unit
21 Triggering finger element
22 Protective device system
23 Control unit
24 Control program
100 Aircraft

The invention claimed is:

1. A protective device for aircraft window units, comprising:

a frame unit, a multi-part and closable protective unit in the frame unit, at least one pretensionable movement unit on the protective unit and configured to transfer the protective unit from at least one open position state into a closed position state, and a triggering unit coupled to the at least one movement unit via at least one coupling region of the at least one movement unit, wherein, when the protective device is in an installed state in an aircraft window unit, the triggering unit is between an exterior window unit of the aircraft window unit and the frame unit, such that mechanical forces acting on the exterior window unit can be transmitted to the triggering unit for triggering operation at the at least one movement unit.

2. The protective device according to claim 1, wherein the at least one movement unit comprises at least one spring element assembly in the at least one coupling region and which has a tension-maintaining element.

3. The protective device according to claim 1, wherein the triggering unit is coupled to the at least one movement unit via at least two coupling regions of the at least one movement unit, and the triggering unit comprises at least one second transmission unit, such that a triggering operation at the at least one movement unit at a first coupling region can substantially simultaneously also be effected at at least one further coupling region by the triggering unit and the at least one second transmission unit.

4. The protective device according to claim 1, wherein the protective unit comprises at least two slat elements mounted movably in the frame unit and which have respective rotary spindles.

5. The protective device according to claim 2, wherein the at least one movement unit comprises at least one first transmission unit, such that the at least two slat elements are movable simultaneously and in parallel with one another by the at least one movement unit and the at least one first transmission unit.

6. The protective device according to claim 2, wherein the protective device comprises at least two first transmission units and at least two second transmission units, wherein respective rotary spindles of the at least two slat elements are coupled at their respective ends both to a first and to a second transmission unit, such that a triggering operation at the at least one movement unit on a first side of the respective rotary spindles can substantially simultaneously also be effected on a second side of the respective rotary spindles.

7. The protective device according to claim 2, wherein the at least two slat elements are selected from the group consisting of slat elements made of metal, slat elements made of aluminum, slat elements made of metal with a thickness between 10 and 20 mm, or with a thickness of 14 mm, slat elements made of aluminum with a thickness between 10 and 20 mm, or with a thickness of 14 mm.

8. A protective device system for aircraft, comprising:

at least two protective devices according to claim 1, and comprising a control unit coupled to the at least two protective devices and which has a control program, wherein the control unit with control program is configured to detect respective triggering operations at the at least two protective devices and substantially simultaneously effect a triggering operation at the at least one further protective device in each case.

9. The protective device system according to claim 8, wherein the further triggering operation can be effected in accordance with a user-defined spatial proximity of the at least two protective devices to one another.

10. An aircraft comprising at least one protective device according to claim 1.

11. An aircraft comprising at least one protective device system according to claim 8.

* * * * *